Sept. 23, 1969    H. A. McMASTER ET AL    3,468,645
METHOD AND APPARATUS FOR SHAPING GLASS SHEETS
SUPPORTED ON A GAS SUPPORT BED
Filed May 9, 1966    2 Sheets-Sheet 1

INVENTORS
Harold A. McMaster,
BY John J. Kawecka, &
Norman C. Nitschke
Barnard, McEllynn & Reising
ATTORNEYS Sept. 23, 1969  H. A. McMASTER ET AL  3,468,645
METHOD AND APPARATUS FOR SHAPING GLASS SHEETS
SUPPORTED ON A GAS SUPPORT BED
Filed May 9, 1966  2 Sheets-Sheet 2

INVENTORS
Harold A. McMaster,
BY John J. Kawecka, &
Norman C. Nitschke
Barnard, McGlynn & Reising
ATTORNEYS

United States Patent Office 3,468,645
Patented Sept. 23, 1969

3,468,645
METHOD AND APPARATUS FOR SHAPING GLASS SHEETS SUPPORTED ON A GAS SUPPORT BED
Harold A. McMaster, Woodville, Norman C. Nitschke, Perrysburg, and John J. Kawecka, Toledo, Ohio, assignors to Permaglass Inc., Woodville, Ohio, a corporation of Ohio
Filed May 9, 1966, Ser. No. 548,755
Int. Cl. B01d 39/00, 18/02
U.S. Cl. 65—25                                17 Claims

ABSTRACT OF THE DISCLOSURE

A method of treating sheets of glass which may be performed by an apparatus of the instant invention wherein a substantially flat sheet of glass is floated on a fluid while being heated to deformation temperature and thereafter applying forces about the periphery of the sheet to support the sheet and to curve the sheet by forcing the sheet against a shaped surface.

---

In recent years, there has been a greatly increased demand for curved glass sheets for use as automobile windows, television screens, architectural glass, etc. Also, there has been ever increasing recognition of the advantages of tempered glass, particularly its high strength and safety features. There is, therefore, a large demand for windows of relatively thin tempered curved glass. The normal procedure in manufacturing tempered curved glass requires that an individual piece of glass be cut and then formed into a particular shape and then tempered. In order to manufacture curved tempered glass automobile windows, or the like, the essential steps are: (1) forming an untempered glass sheet to proper size, with the edges rounded and polished as desired, (2) heating and bending the sheet to the curvature required, and (3) rapidly and uniformly cooling the curved sheet to provide the temper.

A stock method for bending a sheet of glass to the desired curved configuration is to heat the sheet of glass to its softening or deformation temperature and then pressing the sheet between two mating curved mold surfaces. This press bending method of curving glass sheets involves the heating of the glass sheet in a furnace to its deformation temperature and then moving the glass sheet to a position between the mating curved molds where it is curved as the molds are moved together. In order to temper the curved glass, it is removed from between the molds and positioned in a medium for cooling, such as a blasthead which impinges cool fluid upon the sheet. Normally, the sheet of glass is supported vertically by a plurality of tongs which engage the upper edge of the sheet. In order for a sheet of glass to be at a sufficiently high temperature for tempering after it is removed from the press molds, the sheet of glass must be heated to a very high temperature in the furnace before it is placed between the molds. Because the sheet of glass must be heated to such a high temperature before it is positioned between the molds, it is soft and very susceptible to marring or distortion in the areas adjacent its contact with the tongs by which it is supported. Another problem associated with this method of treating glass is that the curved shape of the sheet of glass may change during the period it is being moved from the molds to the medium for cooling due to plastic flow when it is very hot and/or due to a non-uniform change in temperature across the sheet during this period. That is, the sheet of glass is not heated as it is being curved and is subject to non-uniform cooling before being placed in the tempering meduim, which non-uniform cooling causes the curvature of the sheet to change after pressing. In addition, any cooling of the sheet during the period it is being transferred from the molds to the tempering medium changes the overall ratio of cooling and may adversely affect the final temper of the sheet.

Accordingly, it is an object and feature of this invention to provide a method and apparatus for curving and tempering a sheet of glass wherein a sheet of glass is tempered immediately after being curved to prevent a change in the curvature of the sheet.

Another object and feature of this invention is to provide a method and apparatus for curving and tempering a sheet of glass wherein the sheet of glass is floated on fluid while being heated to its deformation temperature and is thereafter forced against a shaped mold for curving.

A further object and feature of this invention is to provide a method and apparatus for curving and tempering a sheet of glass wherein the sheet of glass is supported at its periphery and forced against a shaped mold for curving and is immediately tempered while supported at its periphery to prevent the degree of curvature in the glass from changing.

In general, these and other objects and features of this invention may be attained in a preferred embodiment of the instant invention which includes a furnace section, a bending section and a tempering section or a blasthead. A bed having a substantially flat upper surface and inlet passages for supplying fluid above the upper surface to float a sheet of glass is disposed within the furnace and extends into the bending section. A shaped mold is disposed in the bending section in spaced relation to and above the bed. A recess is disposed in the bed below the mold and the endless frame is normally disposed in the recess. A sheet of glass is floated above the bed in the furnace section and heated to a deformation temperature which is a temperature sufficient for tempering and is thereafter floated over the bed and into the bending section to a position above the recess. The frame is then moved upwardly to engage the periphery of the sheet of glass to support the sheet of glass and to position the sheet of glass against the shaped mold so that it is curved in conformity with the surface of the mold. After the sheet has been curved, the frame moves the curved sheet of glass downward away from the mold and thereafter moves the sheet horizontally into the blasthead where the sheet is subjected to cooling fluid for tempering. In one preferred mode of operation, the sheet of glass is subjected to heat in the bending section so that it remains at a temperature sufficient for tempering and to prevent the curved sheet from cooling non-uniformly, hence preventing the curvature from changing. Also, the sheet of glass is supported by the frame in the curved configuration as it is moved into the blasthead which aids in maintaining the desired degree of curvature in the sheet. In another preferred mode of operation, the sheet of glass is subjected to cool fluid in the bending section immediately after being curved so that the sheet of glass is tempered and becomes rigid before the curvature of the glass can change due to plastic flow or non-uniform cooling, which in turn eliminates the necessity for a separate tempering section or blasthead.

Other objects and attendant advantages of this invention will be readily appreciated as the same becomes better understood by reference to the following detailed description when considered in connection with the accompanying drawings wherein.

Figure 1:
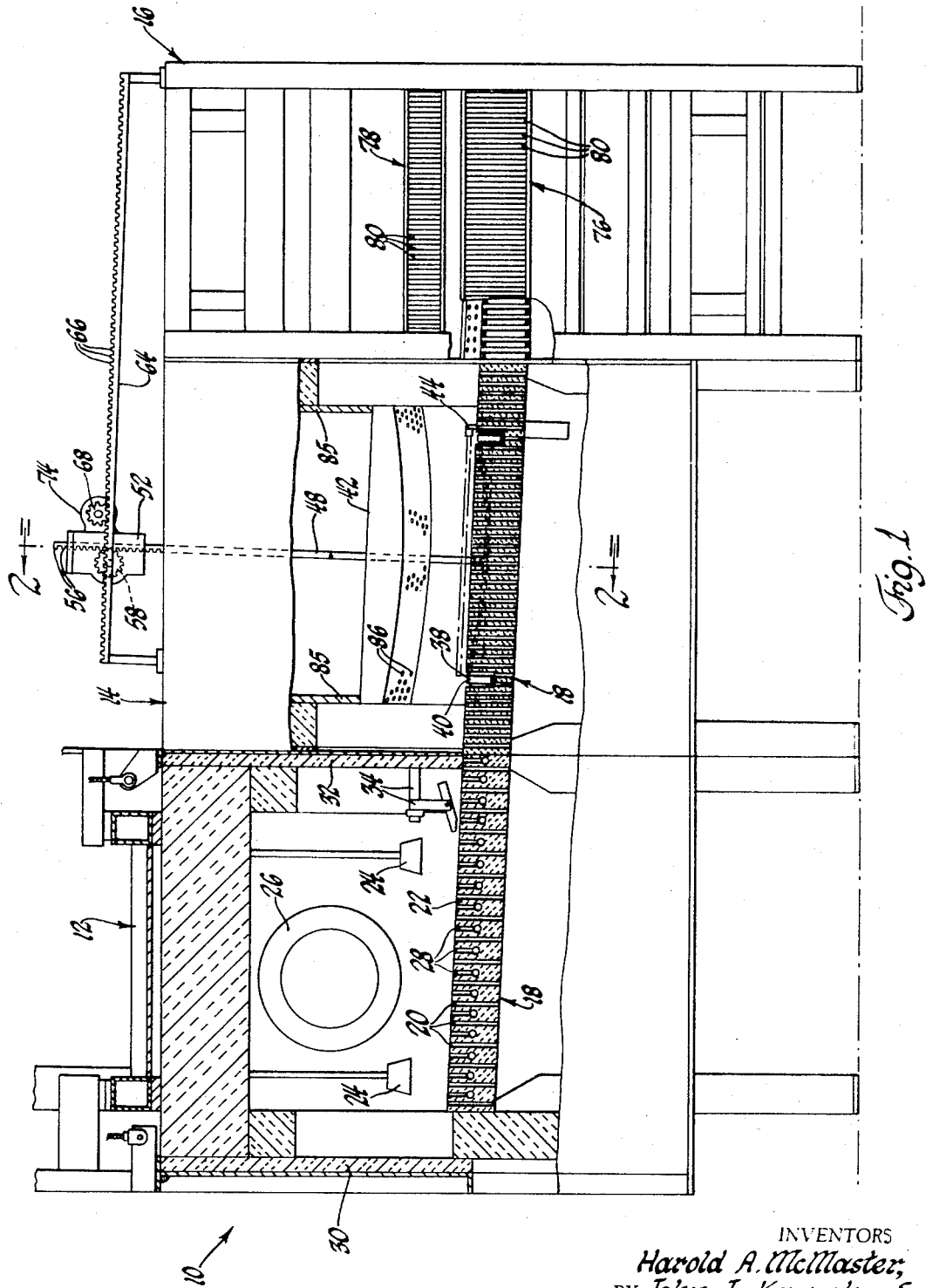
FIGURE 1 is a cross-sectional view partially broken away of a preferred embodiment of the instant invention.
Figure 2:
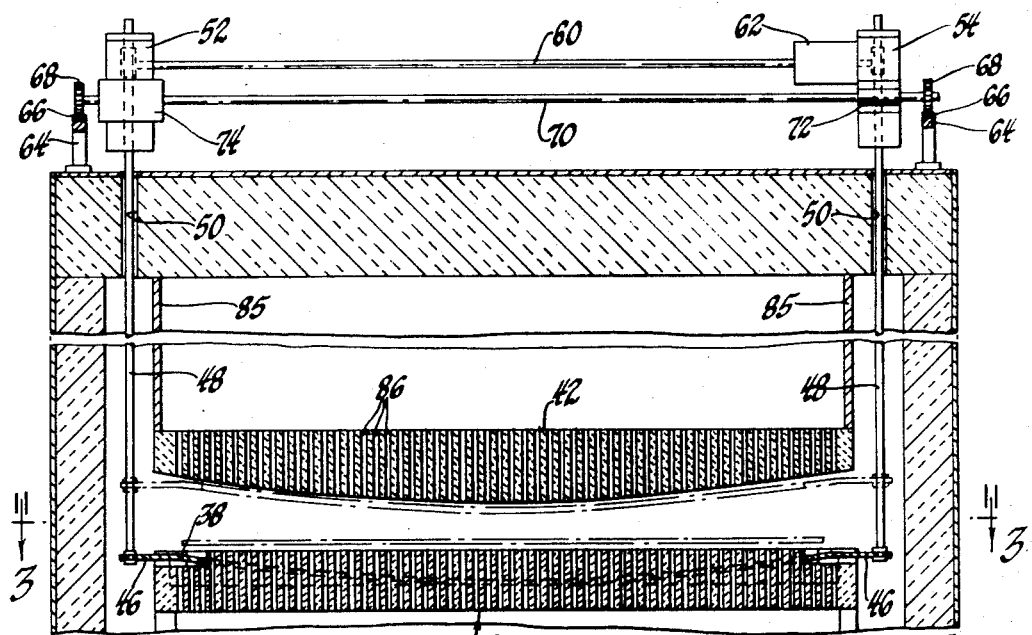
FIGURE 2 is a cross-sectional view taken substantially along line 2—2 of FIGURE 1.
Figure 3:
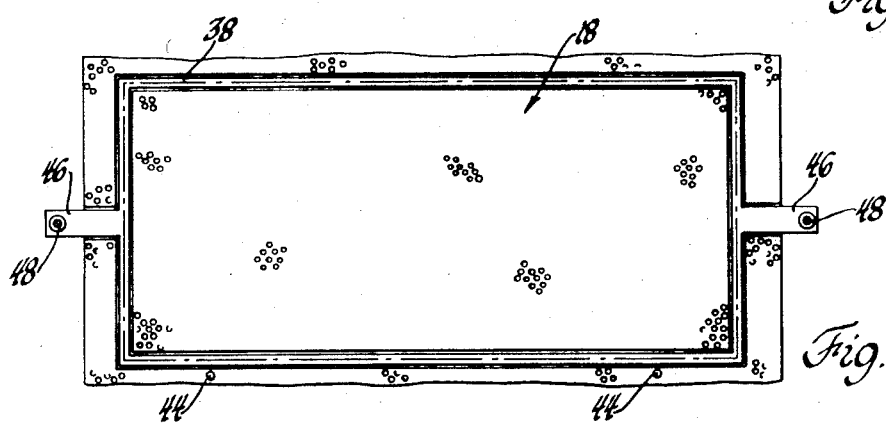
FIGURE 3 is a fragmentary cross-sectional view taken substantially along line 3—3 of FIGURE 2.

Referring now to the drawings, wherein like numerals indicate like or corresponding parts throughout the several views, an apparatus for treating sheet material such as glass is generally shown at 10. The apparatus includes a flow control means, which includes the furnace section 12 and the bending section 14 for heating a substantially flat sheet of glass while floating or supporting the sheet on fluid, and a cooling means comprising the blasthead 16.

A support bed means or a bed, generally indicated at 18, is disposed in the furnace section 12 and extends into the bending section 14. The bed has inlet passages 20 therein for supplying fluid above the upper flat surface 22 of the bed for floating a sheet of glass above the upper surface 22. The heaters 24, which may be electrically or gas operated, are disposed in the furnace for heating a sheet of glass as it floats above the upper surface 22 of the bed 18. One or more blowers 26 are disposed in the furnace 12 for circulating the fluid in the furnace and through the inlet passages 20. The bed 18 also includes outlet or exhaust passages 28 so that the fluid flows upwardly through the inlet passages 20 and between the upper surface 22 and a sheet of glass to adjacent outlet or exhaust passages 28. The furnace section 12 includes a front door 30 which is raised for inserting a sheet of glass into the furnace and a rear door 32 which is raised to allow the floating sheet of glass to move into the bending section 14. A stop means including the arm 34 and the pivoted lever 36 are attached to the door 32 for engaging a sheet of glass. It will be noted that the upper surface 22 of the bed 18 slants downwardly from the furnace section 12 into the bending section 14. Thus, a component of force due to the weight of the sheet of glass urges the floating sheet of glass to move from the furnace section 12 to the bending section 14. The pivoted lever 36 engages the edge of a floating sheet of glass in the furnace section 12 to prevent the sheet of glass from floating into the bending section 14 until the door 32 is raised.

A sheet engaging open-centered means comprising the open-centered endless frame 38 is disposed in a recess 40 in the bed 18 in the bending section 14. The endless frame 38 is selectively movable from the recessed position for engaging at least portions of the periphery of a floating or fluid supported sheet of glass for supporting and curving or shaping the sheet.

A shaped mold 42, which is illustrated as convex but which may be one of various shapes, is disposed in the bending section 14 in spaced relationship to and above the frame 38. A pair of stops comprising solenoid actuated plungers 44, or the like, are disposed in the bending section 14 for engaging the fluid supported sheet of glass as it floats into the bending section 14 to stop movement of the floating sheet of glass at the desired position above the endless frame 38. The plungers 44 are retracted into the bed 18 when the sheet of glass is moved into the blasthead 16.

A pair of arms 46 extend from opposite ends of the endless frame 38 and are connected respectively to the rods 48. The rods 48 extend upwardly adjacent the opposite ends of the mold 42 through slots 50 and into the housings 52 and 54 respectively. The upper end of each rod 48 includes the gear teeth 56 forming a rack to engage a gear 58. The gears 58 are disposed in the respective housings 52 and 54 and are connected to a shaft 60, the shaft 60 being driven by an electric motor 62 which is attached to the housing 54. Hence, upon activation of the motor 62, the shaft 60 is rotated to rotate the gears 58 which in turn moves the rods 48 in unison vertically.

A pair of rails 64 are attached to the top of the bending section 14 and the blasthead 16 and include the gear teeth 66 forming racks for engaging the gears 68. The gears 68 are attached to opposite ends of a shaft 70. The shaft 70 is attached to the housing 54 by being rotatably journaled in the bracket 72 and is driven by a motor 74, the motor 74 being attached to the housing 52. The slots 50 extend across the tops of the bending section 14 and the blasthead 16 so as to be substantially coextensive with the rails 64 so that upon rotation of the shaft 70 by the electric motor 74 the gears 68 rotate to move the housings 52 and 54 horizontally, which in turn moves the frame 38 horizontally. Thus, the frame 38 may be moved from the bending section 14 into the blasthead 16.

The blasthead 16 is disposed sheet of glass to direct cool fluid against the curved sheet for tempering the glass. The blasthead includes spaced flow directing units, generally indicated at 76 and 78. Each of the units 76 and 78 includes a plurality of passages 80 for directing fluid against opposite surfaces of the curved sheet. Although the opposed surfaces of the units 76 and 78 are shown as curved to accommodate the curved sheet of glass, they need not necessarily be curved.

In operation, a sheet of glass is floated above the upper flat surface 22 of the bed 18 in the furnace section 12 while being heated to a deformation temperature which is sufficient for tempering a sheet of glass. Thereafter, the door 32 is raised to disengage the pivoted lever 36 from the edge of the sheet of glass whereby the sheet of glass floats under the force of gravity into the bending section 14 where it contacts the plungers 44 while floating above the bed 18. An appropriate electrical circuit (not shown) sequences the motors 62 and 74 so that when the sheet is in contact with the plungers 44 and floating above the frame 38, the motor 62 is activated to raise the rods 48 whereby the frame 38 engages the periphery of the floating sheet to support the sheet and to move the sheet against the surface of the mold 42 for forming or curving the sheet. After the glass has been curved, the motor 62 rotates in the opposite direction to move the rods 48 downward a sufficient distance to align the sheet of glass and the frame 38 with the space between the units 76 and 78 of the blasthead 16. Thereafter, the motor 74 is activated to rotate shaft 70 and gears 68 to move the rods 48 horizontally so that the frame 38 carries the formed curved sheet of glass into the space between the flow directing units 76 and 78 of the blasthead 16 where the sheet of glass is subjected to cooling fluid being ejected from the passages 80. As the sheet of glass is supported by the endless frame 38 in the blasthead 16 for cooling, the motor 74 is sequenced to move the frame 38 back and forth between opposite sides of the blasthead 16 to oscillate the curved sheet of glass in the blasthead, thus accomplishing a uniform heat transfer over the entire area of the sheet of glass to provide uniform tempering.

The continual support of the sheet of glass on the frame 38 while it is being curved and until it is cooled in the blasthead is a significant feature of the instant invention in that very hot glass is subject to plastic flow and other distortions and by supporting the sheet in the manner that it is supported by the frame 38 a much hotter sheet may be processed without distortion of the glass.

In the embodiment illustrated, the fluid passing through the inlet passages 20 in the bed 18 in the bending section 14 is preferably heated to maintain the sheet of glass at a constant temperature sufficient for tempering while it is being curved and to prevent a non-uniform change in temperature of the sheet after it is curved and before it is tempered for maintaining its curvature constant. In accordance therewith, the mold 42 also includes inlet passages 86 which may be utilized to impinge heated fluid on the upper surface of the sheet of glass before and after it has been curved to maintain it at a temperature sufficient for tempering and to prevent a change in temperature of the sheet so that the sheet can be properly tempered and so that the sheet will not change its curvature due to a non-uniform change in temperature before being tempered. A duct work 85 is provided to direct fluid to the passages 86. Alternatively, a vacuum may be applied in the passages 86 to urge the surface of the glass sheet against the convex mold 42 as it is being curved to conform the glass sheet to the shape of the mold 42.

Figure 4:
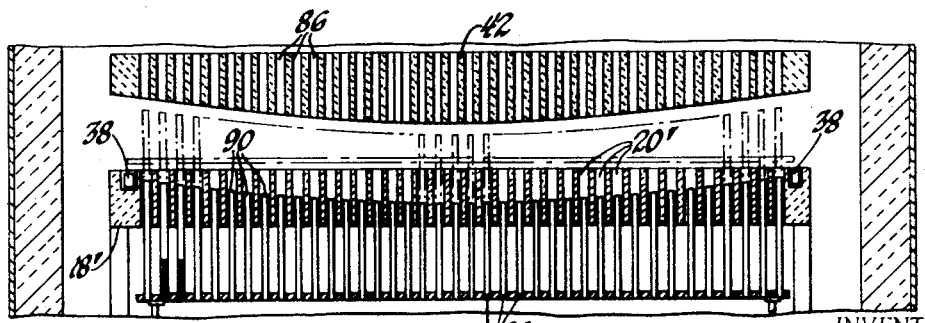
FIGURE 4 is a fragmentary cross-sectional view similar to FIGURE 2 but showing an alternative embodiment of the instant invention.

In an alternative embodiment, the blasthead 16 may be eliminated and the sheet of glass may be tempered in the bending section 14. An apparatus for tempering the curved sheet of glass in the bending section 14 is illustrated in FIGURE 4. The apparatus of FIGURE 4 is utilized in the bending section 14 and is the same as that previously described except for the inclusion of the tubes 88 which are movably disposed in the passages 20' of the bed 18'. In the operation of the embodiment of FIGURE 4, the sheet of glass floats over the frame 38 and the frame 38 moves upwardly and forces the sheet of glass against the mold 42. After the sheet of glass has thus been curved, the frame 38 is moved downwardly to space the sheet only a slight distance from the surface of the mold 42. The upper ends 90 of the tubes 88 form a contour which matches the contour of the mold 42 so that each upper end 90 is disposed at substantially equal distance from the surface of the mold 42. In a first position, as illustrated in FIGURE 4, the upper ends 90 of the tubes 88 are withdrawn into the passages 20' of the bed 18' so that the flat glass sheet may float to a position above the endless frame 38. After the glass sheet has been curved and moved a slight distance away from the surface of the mold 42, the tubes 88 are moved upward to a second position so that the upper ends 90 are disposed above the bed 18' and in closely spaced relationship to the bottom of the sheet of glass. Cooling fluid then flows through the passages 86 in the mold 42 and through the tubes 88 for impingement upon the upper and lower surfaces of the curved sheet of glass for rapidly cooling the sheet of glass immediately after it has been curved.

It is also possible to curve a sheet of glass in the apparatus described without utilizing a mold in that the sheet of glass may be supported on the frame 38 above the bed 18 and allowed to sag to the degree of curvature desired. When the sheet of glass has sagged to the desired degree of curvature, it is immediately subjected to a cool medium for tempering whereby it becomes rigid.

As an added feature, the instant invention may utilize means for contacting the sheet at spaced points while it is supported on the frame to lift the sheet from the frame when the sheet has become sufficiently rigid not to deform, thus allowing full tempering in those areas of the sheet which are in contact with the frame when the sheet is supported thereby. Such may be accomplished by floating the sheet off the frame when it has become sufficiently rigid. Also, fingers normally recessed in the frame and movable above the frame may be utilized to lift the sheet from the frame. Alternatively, elongated fingers may be inserted into the apertures to lift the sheet from the frame.

The furnace section 12 is illustrated as a single station section whereby a sheet of glass is inserted into the furnace section through the door 30 and floats above the bed 18. However, in order to heat a sheet of glass more uniformly, relative movement may be established between the sheet of glass and the upper surface 22 of the bed 18. This may be accomplished by elongating the bed 18 and moving the floating sheet of glass along the bed 18 in the furnace section while the sheet of glass is being heated. An apparatus which may be utilized for this purpose is disclosed in U.S. Patent 3,327,759 in the names of Harold A. McMaster and Norman C. Nitschke and assigned to the assignee of the instant invention. Alternatively, the sheet of glass may be oscillated back and forth over the upper surface 22 of the bed 18 in the furnace section 12. An apparatus which is suitable for this purpose is covered in U.S. application Ser. No. 548,752 filed May 9, 1966 in the name of Harold A. McMaster and assigned to the assignee of the instant invention, which apparatus may also be suitably utilized in the blasthead 16 for oscillating the glass instead of supporting the sheet of glass on the frame 38 between the flow directing units 76 and 78. In addition, the bed 18 need not be slanted downward into the bending section 14 but may have a substantially horizontal upper surface 22, in which case an appropriate conveying or transfer mechanism will be utilized to move the sheets of glass from the furnace section 12 to the bending section 14. It is also to be understood that the frame for supporting and forcing the sheet against the mold surface need not be endless and may be in one of various different forms. Also, the frame need not be recessed into the bed but may surround a bed. Alternatively, the sheet engaging means may take the form of a mating mold having a surface which mates the surface of the upper mold 42 and which mating mold is moved into position to engage and urge the sheet against the upper mold.

The invention has been described in an illustrative manner and it is to be understood that the terminology which has been used is intended to be in the nature of words of description rather than of limitation.

The embodiments of the invention in which an exclusive property or privilege is claimed are defined as follows:

1. In an apparatus for shaping sheet material such as glass including support bed means and means for supplying fluid over said support bed means for supporting a sheet over the said support bed means and heating means for heating the sheet while the sheet is supported on fluid; the improvement comprising sheet shaping means selectively movable from a non-sheet-engaging-first position to engage at least portions of and lift a fluid supported sheet a sufficient distance above said support bed means to permit the shaping thereof.

2. In an apparatus as set forth in claim 1 wherein said support bed means has an upper extremity and inlet passages therein for supplying fluid above upper extremity to support a sheet thereover, said sheet shaping means being disposed below said upper extremity when in said first position.

3. In an apparatus as set forth in claim 1 wherein said sheet shaping means comprises an open-centered-endless-loop frame for engaging the periphery of a fluid supported sheet.

4. In an apparatus as set forth in claim 1 wherein said sheet shaping means includes means to engage at least portions of the periphery of a fluid supported sheet for allowing the sheet to sag under the force of gravity for curving thereof.

5. In an apparatus as set forth in claim 1 including a mold spaced above said support bed means, said sheet shaping means being movable from said first position to engage a sheet to urge the sheet against said mold for shaping the sheet.

6. In an apparatus as set forth in claim 5 wherein said mold includes passages therein for fluid to flow therethrough and means for applying a vacuum in said passages to urge the sheet against said mold for shaping the sheet.

7. In an apparatus as set forth in claim 5 including cooling means comprising a plurality of tubes, the upper ends of which form a contour so that each upper end is substantially an equal distance from the surface of said mold, said tubes being movable between first and second positions, the upper ends of said tubes being withdrawn into said support bed means in said first position, said upper ends of said tubes being disposed above said support bed means and spaced from the surface of said mold in said second position for subjecting the lower surface of the sheet to cooling fluid whereby the sheet may be rapidly cooled immediately after being shaped.

8. In an apparatus as set forth in claim 7 wherein said mold includes passages therein for fluid to flow therethrough.

9. In an apparatus as set forth in claim 1 including a blasthead for receiving a shaped sheet and for directing cool fluid against the shaped sheet to cool the shaped sheet, said blasthead being disposed adjacent the shaping position where said sheet shaping means engages a fluid supported sheet, and wherein said sheet shaping means comprises an endless frame for engaging the periphery of a fluid supported sheet, and means for moving said frame from said shaping position into said blasthead so that a shaped sheet is transported into said blasthead for cooling while supported on said frame whereby the sheet substantially remains in the desired shape.

10. In an apparatus as set forth in claim 9 wherein said apparatus includes a furnace section and a bending section, said shaping position being in said bending section, said bending section being between said furnace section and said blasthead, a mold spaced over said support bed means in said bending section, said frame being movable out of said first position to engage the periphery of a fluid supported sheet to support the sheet and to urge the sheet against said mold for shaping the sheet.

11. In an apparatus as set forth in claim 10 wherein said mold includes passages therein for fluid to flow therethrough.

12. A method of shaping a sheet of material such as glass comprising; heating the sheet to deformation temperature, then supporting the sheet on a fluid at a temperature which continually heats the sheet, and lifting the supported sheet off the fluid with a sheet shaping means which is moved upwardly through the fluid beneath the fluid supported sheet to lift the sheet a sufficient distance to permit the shaping thereof.

13. A method as set forth in claim 12 including cooling the sheet while the sheet is supported on said sheet shaping means.

14. A method as set forth in claim 12 further defined as lifting the fluid supported sheet upwardly and moving the sheet upward against a shaped surface to shape the sheet.

15. A method as set forth in claim 14 including removing the sheet from against said shaped surface while supported on said sheet shaping means, and cooling the sheet while the sheet is supported on said sheet shaping means.

16. A method as set forth in claim 15 including removing the sheet from the sheet shaping means for continuing the cooling of the sheet when the sheet is sufficiently rigid to prevent deformation thereof.

17. A method as set forth in claim 14 including applying a vacuum to the sheet for urging the sheet into conformity with the shaped surface.

References Cited

UNITED STATES PATENTS

| | | | |
|---|---|---|---|
| 3,223,501 | 12/1965 | Fredley et al. | 65—106 X |
| 3,341,312 | 9/1967 | Wheeler et al. | 65—114 X |

S. LEON BASHORE, Primary Examiner

ARTHUR D. KELLOGG, Assistant Examiner

U.S. Cl. X.R.

65—104, 107, 114, 182, 273, 274, 275, 348